Oct. 27, 1959

H. W. SCRAMLIN 2,910,548

TELEPHONE SWITCH

Filed Aug. 31, 1953

INVENTOR.
HENRY WENDELL SCRAMLIN
BY Whittemore
Hulbert & Belknap
ATTORNEYS

United States Patent Office 2,910,548

Patented Oct. 27, 1959

2,910,548

TELEPHONE SWITCH

Henry Wendell Scramlin, St. Petersburg, Fla.

Application August 31, 1953, Serial No. 377,451

4 Claims. (Cl. 179—159)

This invention relates to switches and more particularly to a switch adapted for use in connection with a telephone or the like.

One object of this invention is to provide a switch for an electric circuit which is adapted to be opened and closed in response to the opening and closing of the telephone circuit of the telephone with which the switch is associated.

Another object of the invention is to provide a switch for energizing an electric circuit when the telephone circuit is in use. More particularly the switch is designated to activate an automatic timer to record the number of minutes and seconds that the telephone circuit is in use, thereby to indicate the length of the telephone conversation. The device of the present invention is of particular benefit to persons making large numbers of long distance telephone calls.

Other objects of the invention will become apparent as the following description proceeds, especially when taken in conjunction with the accompanying drawing wherein.

Figures 1, 2:
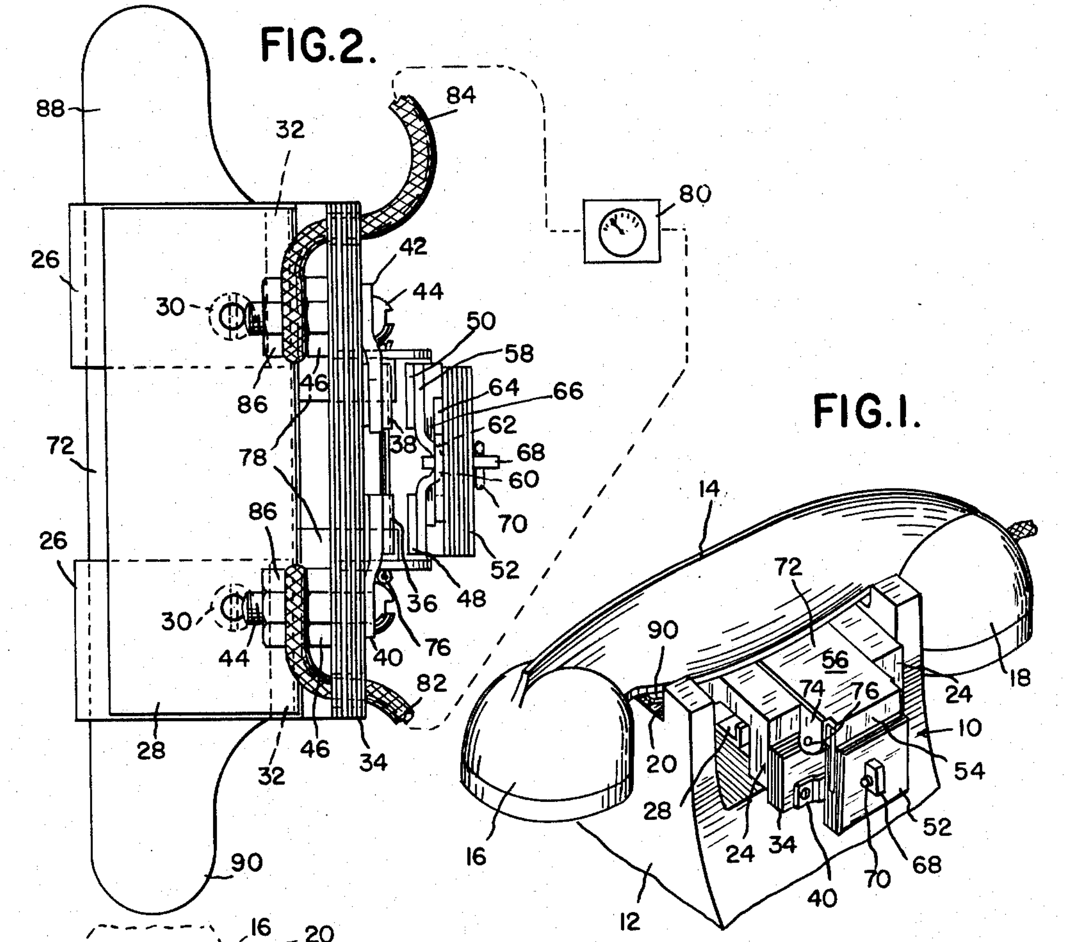
Figure 1 is a perspective view of the telephone switch of my invention shown applied to a telephone of standard design.
Figure 2 is a bottom plan view of the telephone switch.
Figure 3:
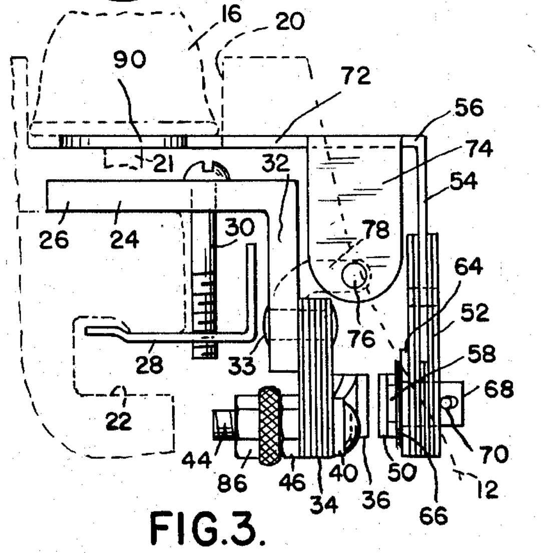
Figure 3 is a side elevational view of the switch being shown in association with a telephone illustrated in dotted lines.

Referring now more particularly to the drawing, and especially to Figure 1 thereof, the switch mechanism is generally indicated at 10 and is shown as being applied to an ordinary telephone of standard design. The telephone comprises a base or housing 12 and a receiver 14 having the usual receiver portion proper 16 and transmitter or mouthpiece 18. The opposite sides of the base 12 of the telephone are formed with the upwardly opening channel-shaped recesses 20 providing a cradle for receiving and supporting the receiver 14 in its stored position. Contact buttons 21 project upwardly through the recesses 20 and are spring biased in an upward direction to their closed circuit position. These buttons are depressed by the receiver in its stored position to open the telephone circuit when not in use. At the rear side of the base, a recess 22 is formed to provide a hand grip for carrying the telephone base. The features of construction of the telephone base and receiver are in accordance with customary design and in themselves form no part of the present invention.

The switch mechanism 10 includes a bracket for securely attaching the same to the telephone, this bracket including a pair of L-shaped clamping member 24, each having horizontally extending legs 26 which extend into the recess provided between the recesses 20 in the opposite side walls of the base and which are adapted to be located beneath the receiver in its stored position. Cooperating with the legs 26 is fastening the switch to the telephone is a clamping plate 28 which extends into the rear recess 22 and is drawn into tight clamping engagement with the telephone base by means of bolts 30 which adjustably connect the clamping plate 28 to the legs 26 of the clamping members.

Clamping members 24 also have leg portions 32 which extend downwardly and have secured to their lower ends by suitable fasteners 33 a strip of electrically insulating material 34. Electrical contacts 36 and 38 are carried at laterally spaced points by the insulating strips. More particularly, the contacts 36 and 38 are respectively carried by the electrically conducting straps 40 and 42 which are secured to the insulating strip by bolts 44 and cooperating nuts 46.

A second pair of electrical contacts 48 and 50 are mounted for engagement with the respective contacts 36 and 38. These contacts 48 and 50 are carried by a strip of electrically insulating material 52 which is suitably secured to the lower end portion of the depending leg 54 of the L-shaped member 56. More specifically, the contacts 48 and 50 are supported at opposite ends of the bar 58 of electrically conducting material, the latter having an arcuate central portion 60 which fits into a similarly shaped recess 62 of plate 64 secured to and carried by the insulating strip 52. The recess 62 permits the bar 58 to rock in a horizontal plane in order to obtain a perfect contact between the contacts 36, 48 and 38, 50. A coiled compression spring 66 is interposed between plate 64 and bar 58 to tension the swivel mounting. The bar 58 is held in the socket or groove 62 by a member 68 which extends loosely through a central aperture in the insulating strip 52 and has a hole therethrough for loosely receiving bar 58. A cotter pin 70 at the outer side of the insulating strip 52 prevents member 68 from being withdrawn.

The contacts 48 and 50 are pivotally supported for movement toward and away from the respective contacts 36 and 38. In detail, the horizontally extending portion 72 of the L-shaped member 56 has secured thereto on opposite sides thereof a pair of depending ears 74 and these ears are mounted at their lower ends by a pivot pin 76 to the extensions 78 rigidly secured to the inner sides of the depending leg portions 32 of the L-shaped clamping members 24. The horizontally extending portion 72 of the L-shaped members 56 projects into the cradle or recess of the telephone and is adapted to be engaged and depressed by the telephone receiver 14 in its stored position, thereby rotating the L-shaped member 56 counter-clockwise and moving the cooperating contacts out of engagement with each other. The pivoted assembly is so proportioned that it rotates in a clockwise direction due to gravity when the receiver is raised to close the telephone circuit for use, making contact between the contacts 36, 48 and 38, 50. Accordingly whenever the telephone receiver is lifted to close the telephone circuit, the switch mechanism 10 is closed.

The switch may be placed in the circuit with a timer, generally indicated at 80, by the leads 82 and 84 which are electrically connected to the nut and bolt assemblies 44, 46 and clamped thereon by the bolts 86. When the switch mechanism 10 is closed, current passes through lead 82 to one of the bolts 44, then through strap 40, contacts 36, 48, bar 58, contacts 50, 38, strap 42, the other bolt 44, and lead 84. Accordingly, whenever the telephone is in use, the circuit to the electric timer is closed and the timer will thereafter faithfully record the period of time during which the telephone is being used. Of course, when the receiver is again placed in its stored position depressing buttons 21 and opening the telephone circuit, the circuit to the electric timer is opened by the switch mechanism 10.

The horizontally extending portion 72 of L-shaped member 56 is also formed with laterally extending projections 88 and 90 which are adapted to overlie the contact buttons 21 which project upwardly through the channel-shaped recesses 20. The resilient force tending to urge the contact buttons upwardly to their closed circuit positions also assists in rotating the pivoted assembly in a clockwise direction to close the switch 10 when the telephone receiver 14 is raised, by the pressure of the buttons acting upwardly against projections 88 and 90.

The contacts 36, 48 and 38, 50 are designed to close at the instant the contact buttons of the telephone are raised sufficiently to close the telephone circuit, and to open when the buttons are depressed sufficiently to open the telephone circuit.

The pivoted assembly may be so balanced that it will rotate in a clockwise direction under the influence of gravity to close the contacts when the telephone receiver is raised, or the spring pressure urging the contact buttons of the telephone upwardly and which is transmitted to the pivoted assembly through the extensions 88 and 90 may be relied upon solely to turn the pivoted assembly clockwise. Obviously a combination of these forces may be employed to close the contacts of the switch 10.

The drawing and the foregoing specification constitute a description of the improved telephone switch in such full, clear, concise and exact terms as to enable any person skilled in the art to practice the invention, the scope of which is indicated by the appended claims.

What I claim as my invention is:

1. Switch mechanism for use with a telephone having a receiver, a base provided with an upwardly opening cradle for receiving and supporting said receiver in the stored position of the latter and a telephone circuit contact member projecting upwardly from the base into said cradle, said contact member being biased in an upward direction to closed position and adapted to be engaged and depressed to open position by said receiver in the stored position of the latter, said switch mechanism comprising a first pair of electrical contacts mounted on said base, a second pair of electrical contacts respectively opposed to said first pair of contacts, means supporting said second pair of contacts for movement into and out of engagement with said first pair of contacts, a rigid bar electrically interconnecting and mounting one of said pairs of contacts, fulcrum means mounting said bar intermediate the contacts thereon for limited rocking movement in a plane including the contacts on said bar to assure perfect engagement between the contacts of one pair with the contacts of the other pair, and a control member movable with said second pair of contacts and extending into said cradle and adapted to be depressed by said receiver in its stored position to move said second pair of contacts out of engagement with said first pair of contacts, said second pair of contacts being movable by gravity into engagement with said first pair of contacts when said receiver is removed from its stored position.

2. Switch mechanism for use with a telephone having a receiver, a base provided with an upwardly opening cradle for receiving and supporting said receiver in the stored position of the latter and a telephone circuit contact member projecting upwardly from the base into said cradle, said contact member being biased in an upward direction to closed position and adapted to be engaged and depressed to open position by said receiver in the stored position of the latter, said switch mechanism comprising a first pair of electrical contacts mounted on said base, a second pair of electrical contacts respectively opposed to said first pair of conttacts, means supporting said second pair of contacts for movement into and out of engagement with said first pair of contacts including a support pivoted on said base, a rigid bar electrically interconnecting and mounting said second pair of contacts, fulcrum means mounting said bar on said support intermediate said second pair of contacts for limited rocking movement in a plane including said second pair of contacts to assure perfect engagement between the contacts of one pair with the contacts of the other pair, said support having a control part extending into said cradle and adapted to be depressed by said receiver in its stored position to move said support about its pivot in a direction to move said second pair of contacts out of engagement with said first pair of contacts, said support being movable by gravity about its pivot in the opposite direction to move said second pair of contacts into engagement with said first pair of contacts when said receiver is removed from its stored position.

3. The combination defined in claim 2 having spring means for tensioning the mounting for said bar and yieldably opposing rocking movement thereof.

4. Switch mechanism for use with a telephone having a receiver, a base provided with means for supporting said receiver in its stored position and a telephone circuit contact member movable between open and closed positions, said contact member being biased to closed position and adapted to be engaged by said receiver in its stored position and shifted thereby to open position, said switch mechanism comprising a first pair of electrical contacts mounted on said base, a second pair of electrical contacts respectively opposed to said first pair of contacts, means supporting said second pair of contacts for movement between first and second positions respectively in and out of engagement with said first pair of contacts, a rigid bar electrically interconnecting and mounting one of said pairs of contacts, fulcrum means mounting said bar intermediate the contacts thereon for limited rocking movement in a plane including the contacts on said bar to assure perfect engagement between the contacts of one pair with the contacts of the other pair, and a control member movable with said second pair of contacts and positioned to be engaged and moved by said receiver in its stored position to move said second pair of contacts to one of its positions relative to said first pair of contacts, said second pair of contacts normally assuming the other position thereof relative to said first pair of contacts when said receiver is removed from its stored position.

References Cited in the file of this patent

UNITED STATES PATENTS

| | | |
|---|---|---|
| 2,165,693 | Bross | July 11, 1939 |
| 2,176,051 | Bamforth | Oct. 13, 1939 |
| 2,212,791 | Reading | Aug. 27, 1940 |
| 2,279,713 | McLorn | Apr. 14, 1942 |
| 2,503,095 | Butler | Apr. 4, 1950 |
| 2,561,950 | Shenk | July 24, 1951 |
| 2,566,840 | Krumreich | Sept. 4, 1951 |
| 2,697,173 | Balakofsky | Dec. 14, 1954 |